(12) United States Patent
Hoebeke

(10) Patent No.: US 6,463,075 B1
(45) Date of Patent: Oct. 8, 2002

(54) TIME MULTIPLEXING METHOD, AND RELATED ARRANGEMENTS TO BE USED IN A CENTRAL STATION AND NETWORK TERMINALS OF A COMMUNICATIONS NETWORK

(75) Inventor: Rudy Georges Hoebeke, Deurne (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/108,693

(22) Filed: Jul. 1, 1998

(30) Foreign Application Priority Data

Jul. 2, 1997 (EP) ............................................. 97401562

(51) Int. Cl.[7] ................................................ H04J 3/16
(52) U.S. Cl. ...................................... 370/458; 370/442
(58) Field of Search ................................ 370/458, 462, 370/216, 422, 294, 378, 321, 335, 359, 370, 376, 384, 394, 399, 245, 259, 338, 344, 347, 352, 353, 358, 371, 380, 395, 400, 427, 474, 449, 337, 341, 461, 442; 379/244, 220; 358/425; 709/215, 203, 226; 375/260; 713/201; 725/107, 131; 707/10, 104, 204

(56) References Cited

U.S. PATENT DOCUMENTS

| | | | |
|---|---|---|---|
| 4,245,245 A | | 1/1981 | Matsumoto et al. |
| 4,774,704 A | * | 9/1988 | Gass et al. ................... 370/294 |
| 4,893,302 A | * | 1/1990 | Hemmady et al. .......... 370/427 |
| 4,922,486 A | * | 5/1990 | Lindinsky et al. .......... 370/427 |
| 5,079,761 A | * | 1/1992 | Krumenacker et al. ..... 370/378 |
| 5,251,324 A | | 10/1993 | McMullan, Jr. |
| 5,754,535 A | * | 5/1998 | Vandenabeele et al. ..... 370/321 |

FOREIGN PATENT DOCUMENTS

| | | |
|---|---|---|
| EP | 0667696 | 8/1995 |
| WO | 9116775 | 10/1991 |
| WO | 9419909 | 9/1994 |

OTHER PUBLICATIONS

"Short Slot Proposal" by Bridger, et al, dated Apr. 22–23, 1997 (Full Service Access Network—Optical Access Network) workgroup.

* cited by examiner

Primary Examiner—Dang Ton

(57) ABSTRACT

In a communications network wherein a central station (CS) is coupled to a plurality of network terminals (T1, T2, T3, T4) via the cascade connection of a common link (L) and respective individual links (L1, L2, L3, L4), and wherein the network terminals (T1, T2, T3, T4) transmit information in a time multiplexed way towards the central station (CS), the central station (CS) assigns timeslots for the upstream transmission to the network terminals (T1, T2, T3, T4) by broadcasting group identifiers (GI1, GI2, GI3, GI4). Each group identifier (GI2) identifies a precomposed group (GI2) of network terminals (T2, T3) which respect a predetermined order for occupying upstream timeslots. In this way, the central station (CS) can assign a plurality of timeslots to a plurality of network terminals (T2, T3) by transmission of only one single group identifier (GI2).

14 Claims, 2 Drawing Sheets

TIME MULTIPLEXING METHOD, AND RELATED ARRANGEMENTS TO BE USED IN A CENTRAL STATION AND NETWORK TERMINALS OF A COMMUNICATIONS NETWORK

TECHNICAL FIELD

The present invention relates to a method to assign upstream timeslots to a plurality of network terminals, in a communications network wherein a central station is coupled to the plurality of network terminals via the cascade connection of a common link and respective individual links and wherein the network terminals transmit upstream information to the central station in a time multiplex way over the common link using the upstream timeslots. It is also directed to an arrangement to be used in a network terminal to perform this method, wherein a central station is coupled to the plurality of network terminals via the cascade connection of a common link and respective individual links and wherein the network terminals transmit upstream information to the central station in a time multiplexed way over the common link using the upstream timeslots of a communications network an arrangement to be used in a network terminal.

The invention is further directed to an arrangement to be used in a central station of a communications network to perform this method, wherein a central station is coupled to a plurality of network terminals via the cascade connection of a common link and respective individual links and wherein the network terminals transmit information to the central station in a time multiplexed way over the common link using upstream timeslots assigned by the central station.

BACKGROUND OF THE INVENTION

Such a method is already known in the art, e.g. from the proposal to the FSAN-OAN (Full Service Access Network—Optical Access Network) Workgroup entitled 'Short Slot Proposal'. This proposal is written by the authors Mark Bridger, Dan Donovan, Paul Welton, and Mike Haynes, and dated Apr. 22–23, 1997. Therein, the central station of a passive optical network (PON) with point-to-multipoint architecture regularly broadcasts so called PLOAM (Physical Layer Operation Administration and Maintenance) cells containing identifiers of the network terminals which are allowed to send a burst in the upstream timeslots of an upstream frame. The central station in the optical network of the mentioned proposal is called the OLT (Optical Line Termination), whereas the network terminals are named ONU's (Optical Network Units). The contents of such a PLOAM cell as proposed by Mark Bridger et al. is shown in a figure on page 4 of the just cited proposal. The 30 grant messages therein each contain an ONU identifier. Each ONU identified in the PLOAM cell is permitted to occupy one timeslot. By downstream broadcasting this message, all ONU's in the network become aware of the order wherein they are allowed to occupy upstream timeslots for transmission of data bursts towards the OLT. The upstream timeslots may be standard full size upstream slots with a length of 56 bytes or short slots with a length of 7 bytes. Schemes of the contents of such a short slot and such a standard full size slot are drawn in the figures on pages 2 and 3 of the proposal.

Broadcasting for each upstream timeslot an identifier of the network terminal that is allowed to send an upstream burst in it inevitably involves a high downstream bandwidth occupancy by grant messages. Especially the upstream transmission of short bursts in short timeslots requires a relatively high downstream bandwidth capacity for transfer of overhead information. In networks such as the passive optical network in the cited proposal, the length and transmit rate of PLOAM cells are fixed, and thus the bandwidth available for downstream transmission of grant messages is fixed and limited. Applying the known method for assigning timeslots to network terminals in such networks puts a severe limit on the number of timeslots within an upstream frame, irrespective of the length of these timeslots.

SUMMARY OF THE INVENTION

An object of the present invention is to provide a method to assign upstream timeslots to a plurality of network terminals and related arrangements of the above known type, but wherein the downstream bandwidth occupancy to assign a certain amount of upstream timeslots is reduced or, in other words, wherein the amount of timeslots that can be assigned with a certain downstream bandwidth capacity is increased.

According to the invention, this object is achieved by a method to assign upstream timeslots to a plurality of network terminals in a communications network wherein a central station is coupled to the plurality of network terminals via the cascade connection of a common link and respective individual links and wherein the network terminals transmit upstream information to the central station in a time multiplexed way over the common link using the upstream timeslots, wherein the central station downstream broadcasts a group identifier to assign a plurality of the upstream timeslots in a predefined order to network terminals of a group of the plurality of network terminals, the group having a predefined composition and being identified by the group identifier.

The object is also achieved by an arrangement to be used in a network terminal of a communications network wherein a central station is coupled to a plurality of network terminals via the cascade connection of a common link and respective individual links and wherein the network terminals transmit information to the central station in a time multiplexed way over the common link using upstream timeslots assigned by the central station, the plurality of network terminals comprising the network terminal, wherein the arrangement comprises: comparison means, adapted to compare a group identifier, downstream broadcasted by the central station to assign a plurality of the upstream timeslots in a predefined order to network terminals of a group of the plurality of network terminals, the group being identified by the group identifier, with group identifiers of groups of network terminals whereof the network terminal forms part; and control means, coupled between the comparison means and a transmitting part of the network terminal and adapted to control, in case the group identifier downstream broadcasted matches one of the group identifiers, the transmitting part to transmit an upstream burst in a thereby assigned upstream timeslot and to respect the predefined order.

The object is still further achieved by an arrangement to be used in a central station of a communications network wherein the central station is coupled to a plurality of network terminals via the cascade connection of a common link and respective individual links and wherein the network terminals transmit information to the central station in a time multiplexed way over the common link using upstream timeslots assigned by the central station, where the arrangement comprises: selection means adapted to select a pre-composed group of network terminals; message generating means, to an input of which the selection means is coupled and which is adapted to generate a broadcast message including a group identifier of the precomposed group of network terminals; and a transmitting part, to an input of which the message generating means is coupled, the transmitting part being adapted to broadcast the broadcast message to the plurality of network terminals to thereby assign a plurality of the upstream timeslots in a predefined order to the network terminals of the precomposed group.

Indeed, no more bandwidth than that used in the known method to assign a timeslot to a single terminal, is used according to the present invention to assign a plurality of timeslots to a plurality of terminals. More precisely, as many timeslots are assigned as there are network terminals in a group. The amount of downstream bandwidth needed thereto is that for transmission of a group identifier and may be considered equal to that needed for transmission of a terminal identifier in the known method. As a result, the downstream bandwidth occupancy to assign an equal amount of timeslots to terminals is reduced with a factor equal to the number of network terminals that composes one group. If, on the other hand, the downstream bandwidth for transmission of grant information is fixed, the same amount of bandwidth can be used according to the present invention to assign an increased number of timeslots. Compared to the known method, the number of timeslots that can be assigned has increased by a factor equal to the number of network terminals composing one group.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noted that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional feature of the present invention is the composition is predefined by the central station and communicated from the central station to the plurality of network terminals.

A further feature of the invention is such an arrangement that further comprises grouping means, adapted to precompose the group of network terminals and to assign thereto the group identifier; and communication means, coupled between the grouping means and another input of the transmitting part, the communication means being adapted to generate a message containing information with respect to the composition of the precomposed group.

In this way, when the central station itself composes the groups of terminals, the central station is able to modify the composition of groups whenever this is preferable. When a terminal is de-activated for instance, it is preferred to eliminate this terminal from all groups where it belongs to so that it does not receive any permission anymore to occupy upstream timeslots. It also is preferable to compose a group of most active terminals, so that no timeslot is to be assigned to a little active terminal each time a timeslot is assigned to the most active terminal. Obviously, the composition of this group changes in time.

Another additional feature of the present invention is where the composition is predefined implicitly via a membership-relation between the group identifier and terminal identifiers of the network terminals that form part of the group.

Compared with the above mentioned implementation of the present invention composing the groups implicitly via a membership-relation has the advantage that no additional complexity is required in the central station for composing the groups and communicating the composition of the groups to the network terminals. On the other hand, composing the groups via a membership-relation has the drawback that the groups are not modifiable.

A further feature of the implementation of the present method is wherein the group is composed of a first network terminal whose terminal identifier equals the group identifier, and at least one network terminal with successive terminal identifier.

By composing for example a group with group identifier 1 of the terminals with identifiers 1, and 2, a group with group identifier 2 of terminals with identifiers 2, and 3, a group with group identifier k of the terminals with identifiers k, and k+1, any terminal can determine from its own terminal identifier whether it belongs to a group or not if it receives the identifier of this group. Thus, the terminal does not need to memorize a table of groups where it belongs to. It only has to be aware of the membership-relation between its terminal identifier and the group identifiers of groups where it belongs to.

Also a further feature of the present invention is wherein the arrangement further comprises: memory means with an output coupled to an input of the comparison means, the memory means being adapted to memorize the group identifiers of the groups of network terminals whereof the network terminal forms part.

In this way, a network terminal is capable of memorizing the groups where it forms part of and the table can be adapted whenever the composition of groups has changed. The use of such a table, as already indicated in the previous paragraph, is avoided in implementations of the present invention wherein each terminal can determine the groups where it forms part of from a simple membership-relation.

Yet a further feature of the present invention is where the memory means further is adapted to memorize for each group of the groups of network terminals whereof the network terminal forms part, an index of the network terminal in the group, i.e. an integer number defining the predefined order for the group.

In this way, a network terminal is aware of the predefined order to be respected by the terminals composing a single group in case this order is not derivable from a membership-relation or any other rule known by the terminal. From the index, the network terminal can determine in which timeslot it is allowed to transmit a burst and from which starting time it is allowed to transmit this burst if the timeslots have fixed lengths. The terminal moreover can keep track of any changes in order between terminals in one group if, for some unspecified reason, this would be preferable.

Still a further feature of the present invention is where the memory means further is adapted to memorize for each group of the groups of network terminals where the network terminal forms part of, time reference information defining the starting time of an upstream timeslot wherein the network terminal is allowed to send information and where the message generating means further is adapted to embed in the broadcast message time reference information defining the starting time of the upstream timeslots assigned to the network terminals of the precomposed group.

In this way, a network terminal is also capable of determining the starting time from which it is allowed to transmit a burst in case the timeslots have variable lengths. This is for instance so in the co-pending European Patent Application entitled 'Time Slot Management Method and Main Station and Substation Realizing such a Method and Time Division Multiple Access Network Including such a Main Station and such a Substation', filed at even date by the same applicant. The time reference information for instance can be the offset from the start time of an upstream timeslot to the start time of an upstream frame, or the offset of the start time of a short timeslot to the start time of a standard timeslot whereof a short timeslot forms part if only the short timeslots are made modifiable in length Still a further feature of the present invention is where the memory means further is adapted to memorize for each group of the groups of network terminals where the network terminal forms part of, a timeslot length defining the length of an upstream timeslot wherein the network terminal is allowed to send information and where the message generating means further is adapted to embed in the broadcast message timeslot lengths for the plurality of upstream timeslots assigned to the network terminals of the precomposed group.

In this way, the central station can adapt the length of a timeslot assigned to a specific terminal whenever this is desired, and the network terminal is capable of determining the length of the timeslot in which it is allowed to transmit an upstream burst.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
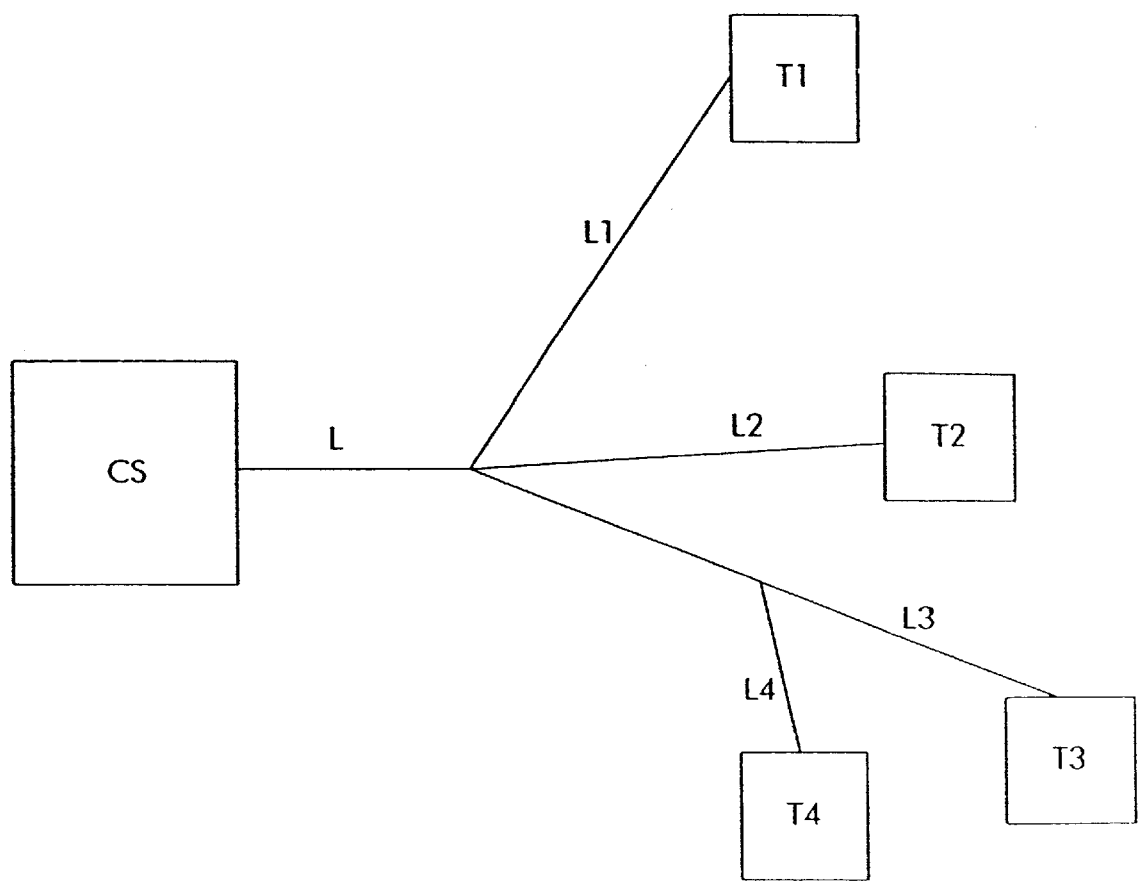
FIG. 1 represents a scheme of a communications network wherein the present invention is applied.

The communications network drawn in FIG. 1 is composed of a central station CS and network terminals T1, T2, T3 and T4. The central station is coupled to the network terminals T1, T2, T3 and T4 via the cascade connection of a common optical fiber link L and respective individual optical fiber links L1, L2, L3 and L4. The network hence has a point-to-multipoint architecture in the downstream direction, which is the direction from the central station CS to the network terminals T1, T2, T3 and T4, and a multipoint-to-point architecture in the upstream direction, i.e. the direction from the network terminals T1, T2, T3 and T4 towards the central station CS.

In the downstream direction, the central station CS broadcasts information to all network terminals, T1, T2, T3 and T4. The information is empacked in so called downstream frames. In the opposite direction, the network terminals T1, T2, T3 and T4 commonly share the link L in a time-multiplexed way. This means that different network terminals transmit information to the central station CS in different timeslots. Each terminal thus sends upstream information in short bursts to the central station CS. The upstream timeslots constitute so called upstream frames.

To be allowed to send a burst in an upstream timeslot, a network terminal, T2 for instance, has to receive a permission or grant from the central station CS. At regular time intervals, such permissions are downstream broadcasted for a plurality of subsequent upstream timeslots at once. The central station CS then broadcasts a so called PLOAM (Physical Layer Operation Administration and Maintenance) cell wherein the contents of grant fields defines precisely who is allowed to occupy which upstream timeslot. Briefly explained, the central station CS first composes groups of terminals and allocates a unique group identifier to each group composed. The terminals T1, T2, T3 and T4 are informed about the composition of the groups. In the grant fields of the PLOAM cells, broadcasted regularly, the central station CS than identifies the groups of terminals which are allowed to occupy subsequent timeslots and if the terminals are ordered within each group, each terminal can detect, upon receipt of a PLOAM cell, whether it is assigned a timeslot. If it is, the terminal can determine exactly, from the order of the group identities in the PLOAM message and the order of the terminals within the group where it forms part of, which timeslot it is permitted to occupy.

Figure 2:
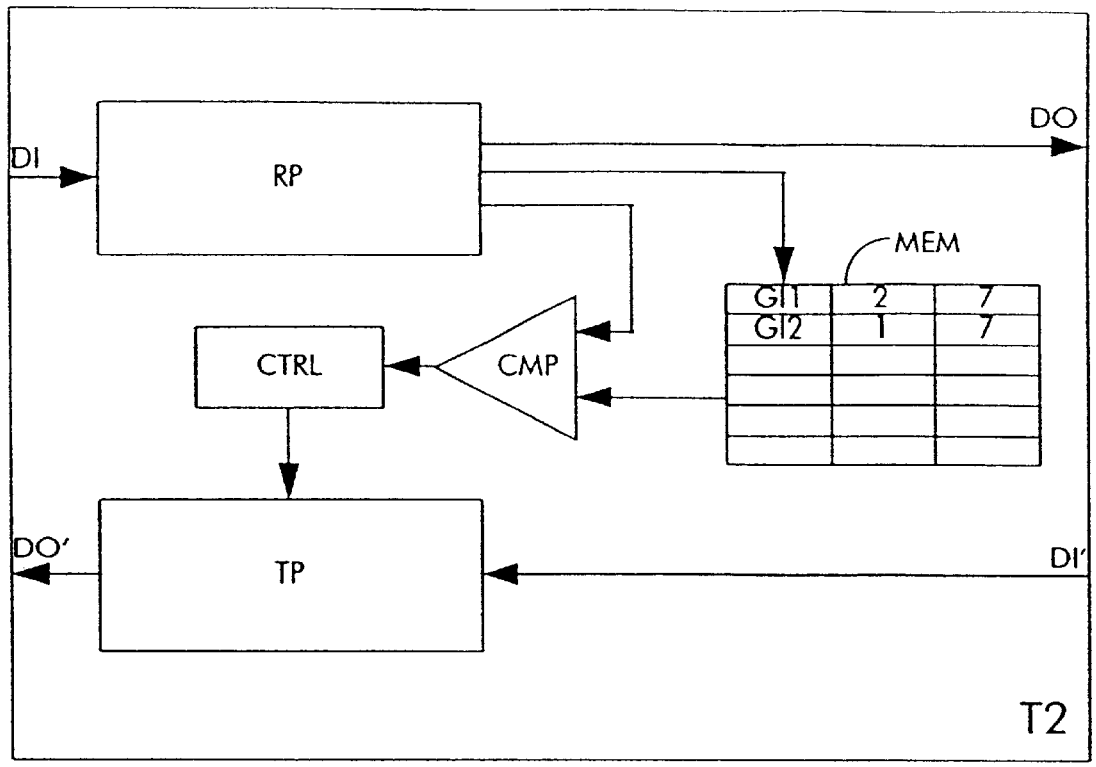
FIG. 2 represents a block scheme of a network terminal T2 provided with an embodiment of the arrangement to be used in a network terminal according to the present invention.

A functional block scheme of the network terminal T2 of FIG. 1 is drawn in FIG. 2. This terminal T2 includes a receiving part RP, a transmitting part TP, a memory MEM, a comparator CMP, and a controller CTRL. The receiving part RP is coupled between a first data input DI and a first data output DO of the terminal T2, has an output coupled to the memory MEM, and another output coupled to one of the inputs of the comparator CMP. An output of the memory MEM is coupled to another input of the comparator CMP. The controller CTRL is coupled in between an output of the comparator CMP and a control input of the transmitting part TP, and the latter transmitting part TP is coupled between a second data input DI' and a second data output DO' of the network terminal T2. From the functional description of the different blocks, given in a later paragraph, a person skilled in the art of designing electronic components will be able to deduce how these blocks can be constituted from standard electronic components. First, the following paragraph outlines the structure of the central station CS of FIG. 1 in terms of functional blocks.

Figure 3:
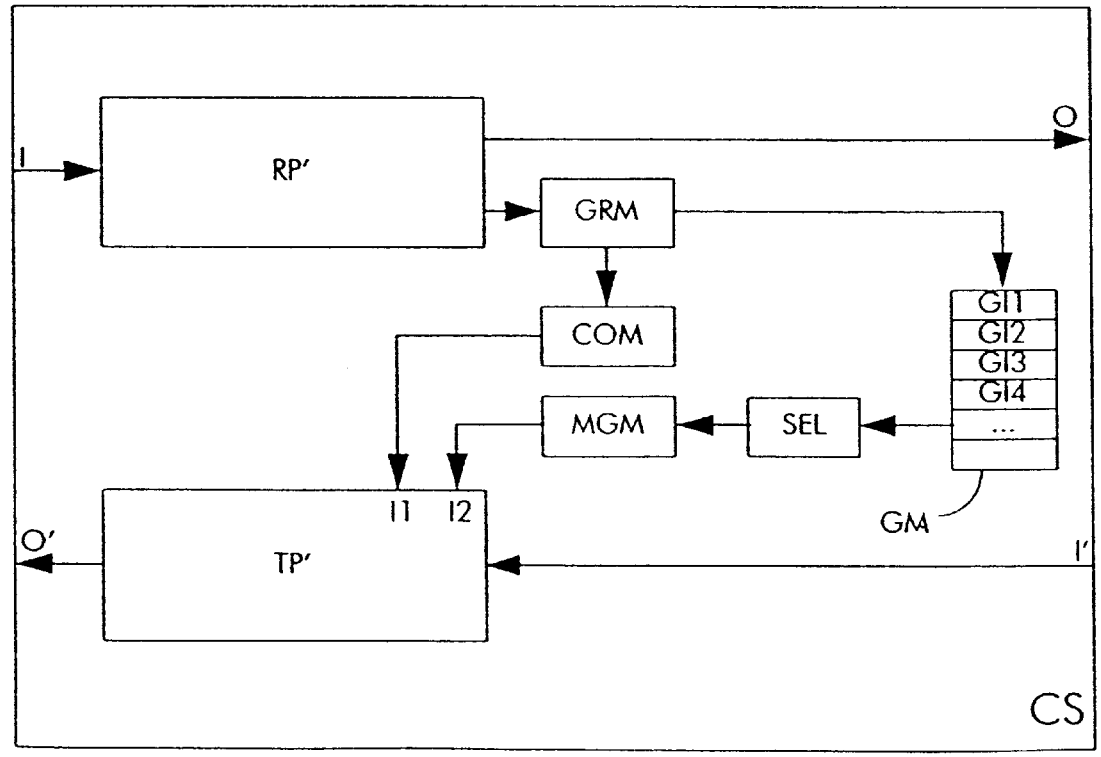
FIG. 3 represents a block scheme of a central station CS provided with an embodiment of the arrangement to be used in a central station according to the present invention.

A functional block scheme of the central station CS of FIG. 1 is drawn in FIG. 3. The central station CS is provided with a receiving part RP', a transmitting part TP', a grouping device GRM, a group memory GM, a group selector SEL, a message generator MGM and a communication device COM. The receiving part RP' is coupled between a first data input I and a first data output O, and similarly, the transmitting part TP' is coupled between a second data input I' and a second data output O'. An additional output of the receiving part RP'is connected to an input of the grouping device GRM, which has a first output coupled to the group memory GM and a second output coupled to the communication device COM. The latter communication device COM further is coupled via an output to an input I1 of the transmitting part TP'. Between an output of the group memory GM and a second input I2 of the transmitting part TP', the selector SEL and message generator MGM are cascade connected.

Via its receiving part RP', the central station CS receives status information from the different network terminals T1, T2, T3 and T4. This status information for instance describes the filling level of queues or buffers inside the network terminals T1, T2, T3 and T4. On the basis of this status information, the activity of the terminals T1, T2, T3 and T4 and some other parameters, the grouping device GRM inside the central station CS composes groups of terminals: G1, G2, G3, G4, . . . . The grouping device GRM assigns a group identifier, GI1, GI2, GI3, GI4, . . ., to each group G1, G2, G3, G4, . . ., it composes. The group identifiers GI1, GI2, GI3, GI4, . . . , and information with respect to the composition of each group is then applied to the group memory GM to be stored therein and to the communication device COM to be communicated to the terminals T1, T2, T3 and T4. For each new group identifier, the group memory GM stores a new entry. If the group identifier received from the grouping means GRM already exists, the entry related thereto is overwritten in the group memory GM. This is so when the composition of an existing group has changed. The communication device COM embeds the information with respect to the groups in messages and applies these messages to the transmitting part TP'via input I1 thereof. The transmitting part TP'then broadcasts the messages towards the terminals T1, T2, T3, and T4 so that they all become aware of the composition of the groups.

The receiving part RP of terminal T2 filters out any message of the just described type, containing information of a group where the terminal T2 forms part of and applies the information to the memory MEM to be stored therein. In this memory MEM, an entry is stored for each group where the terminal T2 forms part of. Suppose for instance that the central station CS in FIG. 3 has composed 4 groups G1, G2, G3 and G4, with identifiers GI1, GI2, GI3, and GI4, and respective compositions T1 and T2 for G1, T2 and T3 for G2, T3 and T4 for G3, and T4 and T1 for G4. Then, the terminal T2 memorizes in MEM that it forms part of group G1 by storing in a first entry the group identifier GI1 and that it forms part of group GI2 by storing in a second entry the group identifier GI2. In addition, the terminal T2 memorizes its index in the groups where it belongs to. So, for group G1 with identifier GI1, terminal T2 memorizes that it is the second terminal of the group, and for group G2 with identifier GI2 terminal T2 memorizes that it is the first terminal in the group. The indices 2 and 1 are thus stored in the second column of the memory MEM in FIG. 2. At this stage, the central station CS is aware of the composition of all groups of terminals, and each network terminal T1, T2, T3 and T4, is aware of the groups where it is a member of and knows its index in these groups. The phase of pre-composing groups of terminals and predefining an order within each group of terminals is herewith described.

As already explained above, each time the central station CS downstream broadcasts a PLOAM (Physical Operation Administration and Maintenance) cell, it has to embed grant information for the terminals therein. Thereto, the selector SEL selects groups from the group memory GM. The selection may be at random, but more performant ways of selecting groups can be thought off. Groups may be selected cyclically, groups with recently more active terminals may be given a higher priority than groups containing recently less active terminals, groups may be selected on the basis of request information from terminals, or on the basis of the status and quality of service information describing the filling of queues in the different network terminals, and so on. Anyhow, the selector SEL ends up with a selection of groups of terminals which will be permitted to transmit upstream bursts in thereto assigned timeslots. The group identifiers of the selected groups are communicated to the message generating device MGM which embeds the group identifiers in grant messages. The grant messages finally are inserted by the transmitting part TP' in the grant fields of the PLOAM cell and the PLOAM cell is downstream broadcasted to be received by the receiving part of any network terminal.

Suppose for instance that selector SEL selected group G2 so that the group identifier GI2 is embedded in one of the grant fields of a downstream broadcasted PLOAM cell. When this PLOAM cell is received by the receiving part RP of terminal T2 of FIG. 2, the group identifier GI2 is applied to the first input of the comparator CMP. The comparator compares this group identifier GI2 with group identifiers, GI1 and GI2, stored in the different entries of the memory MEM and detects that one of the entries matches the group identifier GI2 subtracted from the PLOAM cell. This is indicated to the controller CTRL which is further informed about the index of the grant message containing the group identifier GI2 in the PLOAM cell and the index of the terminal T2 in the group G2 stored in the memory MEM. With this information, the controller CTRL can determine exactly which upstream timeslot may be occupied by the transmitting part TP of terminal T2 for transmitting an upstream burst. The controller CTRL activates the transmitting part TP to send an upstream burst in the right timeslot.

Consider, by way of example, the situation wherein one PLOAM cell is downstream transmitted per upstream frame. Such an upstream frame has a fixed length and a fixed number of timeslots. Each PLOAM cell thus has to assign exactly that fixed number of timeslots to network terminals. If the groups composed by the central station CS each contain 2 network terminals, like in the example given above, and if the fifth grant message in a PLOAM cell, received by terminal T2 contains the group identifier GI2, than this terminal T2 knows that it is allowed to occupy timeslot 9 (4×2+1) of the next upstream frame. Herein, 4 represents the number of previous grant messages in the same PLOAM cell (which is the index of the current grant message in the PLOAM cell minus 1), 2 represents the number of network terminals in one group, and 1 represents the index of terminal T2 in group G2 . Supposed that all timeslots have a fixed length, or that any upstream frame is constituted by the same sequence of timeslots with different lengths—such as the upstream frames described in the proposal to the FSAN-OAN group, mentioned in the introductory part of this application, which is constituted of a first sequence of standard timeslots and a second sequence of short timeslots—the terminal T2 can determine the start time for transmission of the upstream burst.

It is to be remarked that application of the present invention does not exclude that the timeslots have varying lengths, such as in the co-pending application of equal filing date and applicant, entitled 'Time Slot Management Method and Main Station and Substation Realizing such a Method and Time Division Multiple Access Network Including such a Main station and such a Substation'. In that case, a network terminal needs additional information to be capable of determining the start time for transmission of an upstream burst. This additional information may be the lengths of the individual timeslots assigned to other terminals so that it can calculate therefrom the starting time of the timeslot assigned to itself, or it may be an offset to a reference point in time. This reference point in time for instance can be the start time of an upstream frame, or the start time of a standard timeslot whereof a short timeslot forms part if only the short timeslots are made modifiable in length. Such information, and information indicating the length of the timeslot that is assigned to the terminal itself also may be stored in the memory MEM drawn in FIG. 2. In FIG. 2 for example, an additional column is already foreseen to store the length of the timeslot assigned to the terminal T2 itself within each particular group, G1 and G2. For both groups, G1 and G2, this length equals 7 bytes.

Also a remark is that the amount of downstream bandwidth gained in comparison with the known method to assign a certain number of timeslots to terminals is proportional to the size of the groups, expressed as the number of network terminals whereof it is composed. This is equivalent to stating that the number of timeslots that can be assigned to network terminals, given a certain downstream bandwidth available, is proportional to this size of the groups. Since however the flexibility of assigning timeslots to network terminals decreases with the size of the groups, there is a trade-off between use of bandwidth and network flexibility which will allow network designers to make a proper choice for the size of the groups.

Furthermore, it is noticed that the use of a memory MEM as described above is superfluous if the network terminal T2 is able to determine from a predefined membership-relation to which groups it belongs. In the above given example for instance, each group is constituted of a terminal whose terminal identifier equals the group identifier, and one additional terminal whose identifier succeeds the identifier of the first terminal. So, group G3 with identifier GI3 is composed of a terminal T3 with identifier TI3 and a terminal T4 with identifier TI4. If this rule is always respected, any network terminal can determine from its own identifier, the group identifiers of the groups where it belongs to as a result of which no storage capacity has to be provided thereto.

Still a remark is that, although links L, L1, L2, L3 and L4 in the above described embodiment are optical fiber links, the applicability of the present invention is not restricted by the transmission medium via which data are transported. In any network with a multipoint-to-point architecture wherein terminals share common links in a time multiplexed way, independent of the fact that these links are twisted pair telephone lines, coaxial cable connections, satellite connections, or radio links through the air, the use of downstream bandwidth for broadcasting upstream timeslot grant information may be optimized according to the present invention.

While the principles of the invention have been described above in connection with specific apparatus, it is to be clearly understood that this description is made only by way of example and not as a limitation on the scope of the invention, as defined in the appended claims.

What is claimed is:

1. A method to assign upstream timeslots to a plurality of network terminals (T1, T2, T3, T4) in a communications network wherein a central station (CS) is coupled to said plurality of network terminals (T1, T2, T3, T4) via the cascade connection of a common link (L) and respective individual links (L1, L2, L3, L4) and wherein said network terminals (T1, T2, T3, T4) transmit upstream information to said central station (CS) in a time multiplexed way over said common link (L) using said upstream timeslots, comprising the steps of:
   identifying, by a group identifier (GI2), a group (G2) with a predefined composition of said plurality of network terminals (T1, T2, T3, T4); and
   downstream broadcasting by said central station (CS) said group identifier (GI2) and thereby assigning a plurality of said upstream timeslots in a predefined order to network terminals (T2, T3) of said group (G2) of said plurality of network terminals (T1, T2, T3, T4).

2. A method according to claim 1, wherein said method further comprises predefining said composition by said central station (CS) and communicating said composition from said central station (CS) to said plurality of network terminals (T1, T2, T3, T4).

3. A method according to claim 1, wherein said method further comprises predefining said composition implicitly via a membership-relation between said group identifier (GI2) and terminal identifiers (TI2, TI3) of said network terminals (T2, T3) that form part of said group (G2).

4. A method according to claim 3, wherein said method further comprises composing said group (G2) of a first network terminal (T2) whose terminal identifier (TI2) equals said group identifier (GI2), and of at least one network terminal (T3) with a successive terminal identifier (TI3).

5. An arrangement to be used in a network terminal (T2) of a communications network wherein a central station (CS) is coupled to a plurality of network terminals (T1, T2, T3, T4) via the cascade connection of a common link (L) and respective individual links (L1, L2, L3, L4) and wherein said network terminals (T1, T2, T3, T4) transmit information to said central station (CS) in a time multiplexed way over said common link (L) using upstream timeslots assigned by said central station (CS), said plurality of network terminals (T1, T2, T3, T4) comprising said network terminal (T2), said arrangement comprising:
   a. comparison means (CMP), adapted to compare a group identifier (GI2), downstream broadcasted by said central station (CS) to assign a plurality of said upstream timeslots in a predefined order to network terminals (T2, T3) of a group (G2) of said plurality of network terminals (T1, T2, T3, T4), said group (G2) being identified by said group identifier (GI2), with group identifiers (GI1, GI2) of groups (G1, G2) of network terminals that said network terminal (T2) forms part thereof; and
   b. control means (CTRL), coupled between said comparison means (CMP) and a transmitting part (TP) of said network terminal (T2) and adapted to control, in case said group identifier (GI2) downstream broadcasted matches one of said group identifiers (GI1, GI2), said transmitting part (TP) to transmit an upstream burst in a thereby assigned upstream timeslot and to respect said predefined order.

6. An arrangement according to claim 5, wherein said arrangement further comprises:
   c. memory means (MEM) with an output coupled to an input of said comparison means (CMP), said memory means (MEM) being adapted to memorize said group identifiers (GI1, GI2) of said groups (G1, G2) of network terminals that said network terminal (T2) forms part thereof.

7. An arrangement according to claim 6, wherein said memory means (MEM) further is adapted to memorize for each group (G1, G2) of said groups of network terminals that said network terminal (T2) forms part thereof, an index (2, 1) of said network terminal (T2) in said group (G1, G2), thereby defining said predefined order for said group (G1, G2).

8. An arrangement according to claim 6, wherein said memory means (MEM) further is adapted to memorize for each group (G1, G2) of said groups of network terminals that said network terminal (T2) forms part thereof, time reference information defining the starting time of an upstream timeslot wherein said network terminal (T2) is allowed to send information.

9. An arrangement according to claim 6, wherein said memory means (MEM) further is adapted to memorize for each group (G1, G2) of said groups of network terminals that said network terminal (T2) forms part thereof, a timeslot length (7, 7) defining the length of an upstream timeslot wherein said network terminal (T2) is allowed to send information.

10. An arrangement to be used in a central station (CS) of a communications network wherein said central station (CS) is coupled to a plurality of network terminals (T1, T2, T3, T4) via the cascade connection of a common link (L) and respective individual links (L1, L2, L3, L4) and wherein said network terminals (T1, T2, T3, T4) transmit information to said central station (CS) in a time multiplexed way over said common link (L) using upstream timeslots assigned by said central station (CS), said arrangement comprising:
 a. selection means (SEL) adapted to select a precomposed group (G2) of network terminals (T2, T3);
 b. message generating means (MGM), to an input of which said selection means (SEL) is coupled and which is adapted to generate a broadcast message including a group identifier (GI2) of said precomposed group (G2) of network terminals (T2, T3); and
 c. a transmitting part (TP'), to an input (I2) of which said message generating means (MGM) is coupled, said transmitting part (TP') being adapted to broadcast said broadcast message to said plurality of network terminals (T1, T2, T3, T4) to thereby assign a plurality of said upstream timeslots in a predefined order to said network terminals (T2, T3) of said precomposed group (G2).

11. An arrangement according to claim 10, wherein said arrangement further comprises:
 c. grouping means (GRM), adapted to precompose said group (G2) of network terminals (T2, T3) and to assign thereto said group identifier (GI2); and
 d. communication means (COM), coupled between said grouping means (GRM) and another input (I1) of said transmitting part (TP'), said communication means (COM) being adapted to generate a message containing information with respect to the composition of said precomposed group (G2).

12. An arrangement according to claim 11, wherein said arrangement further comprises:
 e. group memory means (GM) adapted to memorize group identifiers (GI1, GI2, GI3, GI4, . . . ) of said precomposed groups (G1, G2, G3, G4, . . . ) of network terminals similar to said precomposed group (G2), and provided with outputs coupled to inputs of said message generating means (MGM) and said communication means (COM).

13. An arrangement according to claim 10, wherein said message generating means (MGM) further is adapted to embed in said broadcast message time reference information defining the starting time of said upstream timeslots assigned to said network terminals (T2, T3) of said precomposed group (G2).

14. An arrangement according to claim 10, wherein said message generating means (MGM) further is adapted to embed, in said broadcast message, timeslot lengths for said plurality of upstream timeslots assigned to said network terminals (T2, T3) of said precomposed group (G2).

* * * * *